United States Patent [19]
Morgan et al.

[11] Patent Number: 5,525,143
[45] Date of Patent: Jun. 11, 1996

[54] HOLLOW FIBER MEMBRANE DRYER WITH INTERNAL SWEEP

[75] Inventors: William H. Morgan, Catawissa; Lawrence K. Bleikamp, St. Peters; Dilip G. Kalthod, St. Louis, all of Mo.

[73] Assignee: Air Products and Chemicals, Inc., Allentown, Pa.

[21] Appl. No.: 323,964

[22] Filed: Oct. 17, 1994

[51] Int. Cl.⁶ .......................... B01D 53/22; B01D 63/04
[52] U.S. Cl. ........................................ 95/52; 96/8; 96/10
[58] Field of Search ............................... 95/45, 52; 96/7, 96/8, 10; 210/321.8, 321.89, 500.23

[56] References Cited

U.S. PATENT DOCUMENTS

| | | | |
|---|---|---|---|
| 3,499,062 | 3/1970 | Geary et al. | 264/36 |
| 3,536,611 | 10/1970 | De Filippe et al. | 210/22 |
| 3,735,558 | 5/1973 | Skarstrom et al. | 96/8 X |
| 3,735,559 | 5/1973 | Salemme | 95/52 |
| 4,220,535 | 9/1980 | Leonard | 96/8 X |
| 4,230,463 | 10/1980 | Henis et al. | 95/45 |
| 4,583,996 | 4/1986 | Sakata et al. | 55/16 |
| 4,687,578 | 8/1987 | Stookey | 210/321.1 |
| 4,718,921 | 1/1988 | Makino et al. | 95/52 |
| 4,752,305 | 6/1988 | Johnson | 96/8 X |
| 4,783,201 | 11/1988 | Rice et al. | 55/16 |
| 4,857,081 | 8/1989 | Taylor | 55/16 |
| 4,859,331 | 8/1989 | Sachtler et al. | 96/8 X |
| 4,900,626 | 2/1990 | Fabre | 428/398 |
| 4,961,759 | 10/1990 | Taylor | 95/52 |
| 5,002,590 | 3/1991 | Friesen et al. | 95/52 |
| 5,026,479 | 6/1991 | Bikson et al. | 210/321.8 |
| 5,108,464 | 4/1992 | Friesen et al. | 55/16 |
| 5,149,340 | 9/1992 | Waycuilis | 95/52 X |
| 5,158,581 | 10/1992 | Coplan | 55/16 |
| 5,160,514 | 11/1992 | Newbold et al. | 95/52 X |
| 5,207,906 | 5/1993 | Auvil et al. | 210/321.8 |
| 5,259,869 | 11/1993 | Auvil et al. | 96/10 X |
| 5,288,308 | 2/1994 | Puri et al. | 96/10 X |
| 5,411,662 | 5/1995 | Nicholas, Jr. et al. | 96/10 X |

FOREIGN PATENT DOCUMENTS

| | | | |
|---|---|---|---|
| 0521784 | 1/1993 | European Pat. Off. | |
| 62-038220 | 2/1987 | Japan | 96/8 |
| 1-224028 | 9/1989 | Japan | 95/52 |
| 1-224029 | 9/1989 | Japan | 95/52 |
| 2-083015 | 3/1990 | Japan | 95/52 |
| 3-086219 | 4/1991 | Japan | 96/10 |
| 6-134245 | 5/1994 | Japan | 96/8 |
| 6-134246 | 5/1994 | Japan | 96/8 |
| 6-134244 | 5/1994 | Japan | 96/8 |

*Primary Examiner*—Robert Spitzer
*Attorney, Agent, or Firm*—Mark L. Rodgers; William F. Marsh

[57] ABSTRACT

The present invention provides a method and apparatus for the dehydration of gases utilizing hollow fiber membranes. The invention provides an internal sweep of the permeate side of the membranes utilizing an aperture in the tubesheet at the product end of the module thereby sweeping the permeate side of the membrane with product gas.

20 Claims, 3 Drawing Sheets

HOLLOW FIBER MEMBRANE DRYER WITH INTERNAL SWEEP

FIELD OF THE INVENTION

The present invention relates to an apparatus and process for dehydrating gases, wherein the apparatus is comprised of hollow fiber membranes having dehydrating capability. More particularly, the invention relates to a membrane gas separation module which provides an internal countercurrent sweep and processes for using the module.

BACKGROUND OF THE INVENTION

It is known to separate one fluid from a mixture of fluids by using a membrane which is more permeable to the one fluid than the others of the mixture. The fluid mixtures are brought into contact with one side of the membrane with a pressure differential being maintained across the membrane, and a permeable fluid will permeate the membrane to the other side thereof, and thereby become separated from the fluid mixture.

In the present instance, moisture or other rapidly diffusing gases are separated from other less rapidly diffusing gases. For instance in the dehydration of air or natured gas, the rate of permeation of the moisture through a membrane is a function of the difference in partial pressures of the moisture on opposite sides of the membrane. If these partial pressures are the same, none of the moisture will permeate the membrane. This can present a problem when it is desired to dehydrate a gaseous mixture containing relatively small amounts of moisture.

Because of the high permeation selectivity of water, the water vapor partied pressure on the permeate side of the membrane can approach that of the feed side, so that the permeation rate of the water becomes very low. One method of solving this problem is to use a sweep gas on the permeate side. The sweep dilutes the permeated water concentration and lowers the water vapor partial pressure on the permeate side, thereby producing higher permeation rates of water.

Several attempts have been made to provide sweep gas to the permeate side of the membrane so as to allow more of the water to permeate the membrane. For instance in U.S. Pat. No. 3,536,611, a membrane device is disclosed which uses a sweep stream to sweep a permeated fluid from a bundle of hollow membranes through which the fluid is permeated. The sweep streams are brought in from opposite ends of the bundle of fibers, and it is obvious that exterior piping and valves, etc. are required for directing the sweep streams into the device. Such piping and valves add to the cost and complexity of the system.

In U.S. Pat. No. 4,687,578, a major fraction of the fiber length is coated to reduce the permeation rate of the gas carrying the moisture, and the remaining fiber length at the non-permeate end of the module is not coated or just partially coated, wherein the gas carrying the moisture permeates rapidly, and thereby provides a sweep gas on the permeate side countercurrent to the feed gas. However, it is difficult to coat fibers with selected coatings, such as defect repair material as defined in U.S. Pat. No. 4,230,463, on only a part of the fiber leaving the rest of the fiber uncoated.

In U.S. Pat. No. 4,783,201, the membrane was not coated, and in an attempt to provide a sweep on the permeate side, controlled porosity of the membranes was effected along the length of the fiber. Here again, a special procedure was required to treat the hollow fiber membrane material to alter the membrane porosity. Low porosity is desired at the moist feed end of the module and higher porosity at the product end to allow high permeation rate of the gas carrying the moisture, thereby providing a countercurrent sweep on the permeate side.

Furthermore, if the fiber used in the module is produced by a process that results in low permeability for the carrier gas, then providing a sweep via permeation through the fiber, as described in the above patents, U.S. Pat. No. 4,687,578 and U.S. Pat. No. 4,783,201, may not be a feasible option. Examples of fiber production processes that can result in low permeability for the carrier gas include wet spinning phase inversion, solution coating, interfacial polymerization, among others. The present invention provides a module with an internal permeate-side sweep, when the fiber to be utilized has a low permeability for the carrier gas.

In the ordinary production of hollow fiber membranes for gas separation modules, the fiber is generally post-treated with a coating material to repair the defects in the membrane and thereby increase its selectivity for gas separation. Heretofore, membranes which have been treated for defect repair have been found to be unsuitable for use in dehydration processes, because no method of satisfactorily providing the sweep gas had been developed. The previous methods are inadequate for the reasons described above.

The present invention provides a hollow fiber membrane module, which provides an adequate internal sweep on the permeate side of the fibers in an economical and easily-produced method.

SUMMARY OF THE INVENTION

The present invention provides a membrane gas separation module, having a countercurrent sweep with a portion of the non-permeate gas on the permeate side of the fibers provided internally of the module. The module is comprised of an elongated shell, having a feed gas inlet and a product outlet at substantially opposite ends of the shell, and a permeate outlet appropriately located. The shell contains hollow fiber membranes positioned so as to extend from a first tube sheet near the feed gas inlet to a second tube sheet near the product outlet, each end of the hollow fibers terminating in and penetrating a tube sheet. The module is also provided with at least one aperture in the second tube sheet to allow non-permeate gas to return to the permeate side of the fibers to provide a countercurrent sweep.

The invention further provides a process for dehydration of a feed gas containing water vapor by contacting the gas with hollow fiber membranes contained in a module shell designed to withstand the operating pressure. The majority of the water vapor contained in the feed gas permeates through the membranes. A portion of the resulting non-permeate dehydrated gas is utilized internally of the module to provide a sweep gas to the permeate side of the hollow fiber membranes substantially countercurrent to the flow of the feed gas. The remaining non-permeate gas is recovered as dehydrated gas product. The sweep gas flow generally is from about 1% to about 80%, preferably from about 2% to about 80%, of the net flow rate of the non-permeate dehydrated gas.

DETAILED DESCRIPTION OF THE INVENTION

Figure 1:
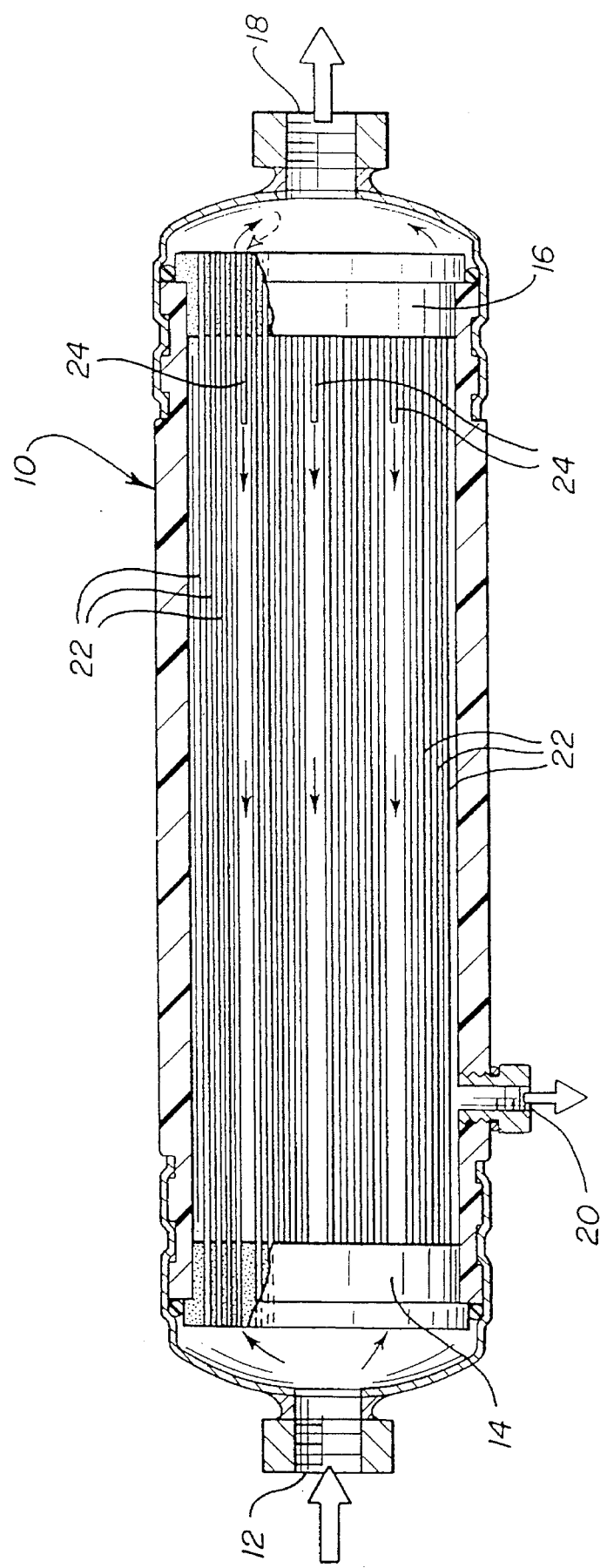
FIG. 1 is an elevational view, partially fragmented, of one embodiment of the present invention.
Figure 2:
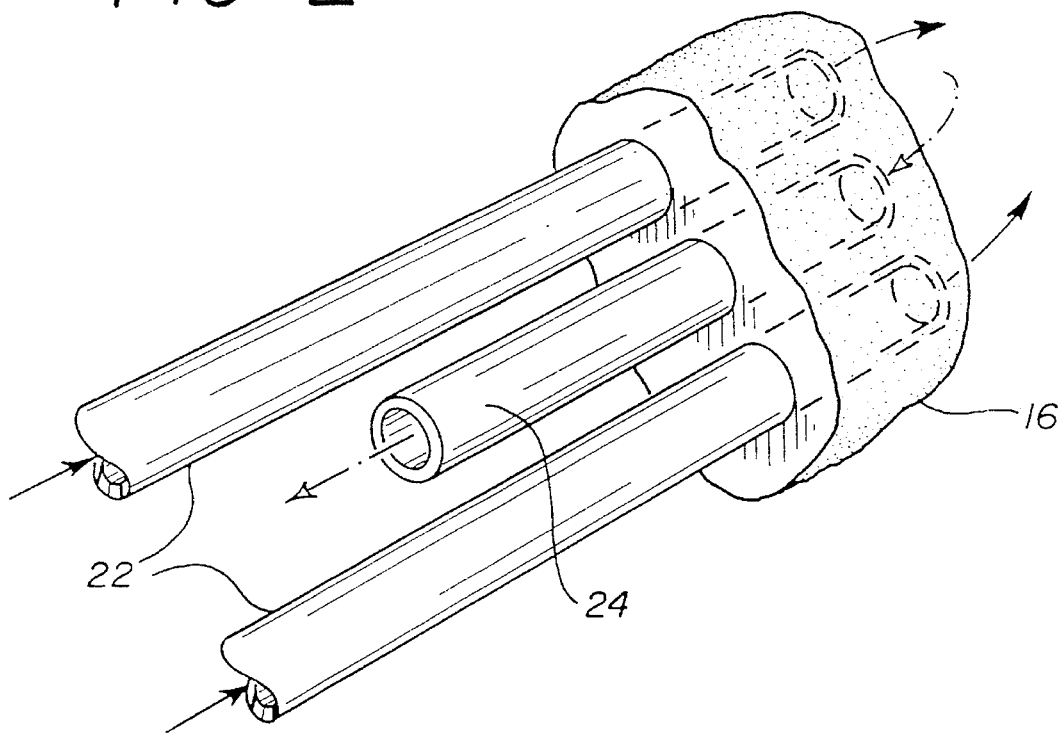
FIG. 2 is an enlarged fragmented view of a small portion of the embodiment of FIG. 1.
Figure 3:
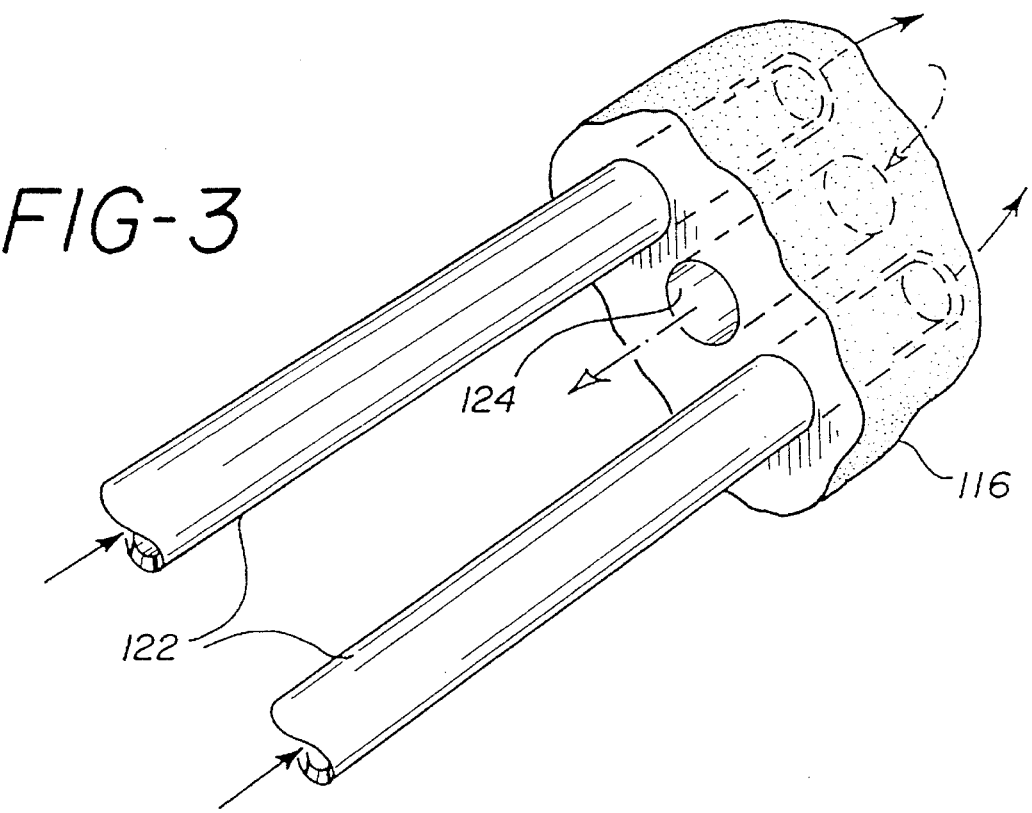
FIG. 3 is another small fragmented view of a portion of the embodiment of FIG. 1.

With respect to FIG. 1, a gas separation module 10 is provided where the feed gas 12 containing water vapor enters the bores of the hollow fibers 22 under pressure at the face of the first tube sheet 14. The water vapor permeates the fibers 22 and exits the module 10 at an exit port 20. The dehydrated gas remains in the bores of the fibers 22 and penetrates the second tube sheet 16 while still under pressure. The short fibers 24 allow a portion of the dehydrated gas to return through the short fiber bores to the permeate side of the fibers 22 thereby providing a countercurrent sweep on the permeate side of the fibers where the sweep exits through the permeate port 20. The dehydrated gas exits at a port 18. Provision of the short fibers 24 through the tube sheet 16, allows a predetermined portion of the dehydrated gas to return through the tube sheet 16 and the short fibers 24 to provide the dehydrated gas at permeate pressure as a countercurrent sweep of the permeate side of the fibers 22. FIG. 2 more clearly shows the manner in which the countercurrent sweep is provided to the exterior of fibers 22 by the returning of a portion of the dehydrated gas through the short fiber 24, all of the fibers penetrating the tube sheet 16.

In FIG. 1, the fibers actually occupy all of the space in the module and do not leave the open channels shown. The open channels are present only to allow the reader to see the short fibers 24 and understand the general flow direction of the non-permeate gas flowing through the short fibers 24 to provide the countercurrent sweep. The view in FIG. 4 more accurately depicts the manner in which the fibers fill the module.

FIG. 8 depicts another embodiment of the present invention wherein the orifice 124 in the tube sheet 116 which allows return of a predetermined amount of the dehydrated gas to the exterior of the fibers 122 is a hole in the tube sheet. One or more holes 124 are provided based on the amount of the dehydrated gas needed for the sweep of the fibers 122 on the permeate side.

In another embodiment, the feed gas enters the module through a port in the shell near the first tubesheet and the dry product exits through a port in the shell near the second tubesheet. The second tubesheet is provided with short fibers or holes similar to those in FIGS. 2 and 8 in order to allow a portion of the dry non-permeate gas to flow through the permeate side, i.e., the fiber bores, as a countercurrent sweep. The permeate gas exits through the first tubesheet.

Figure 4:
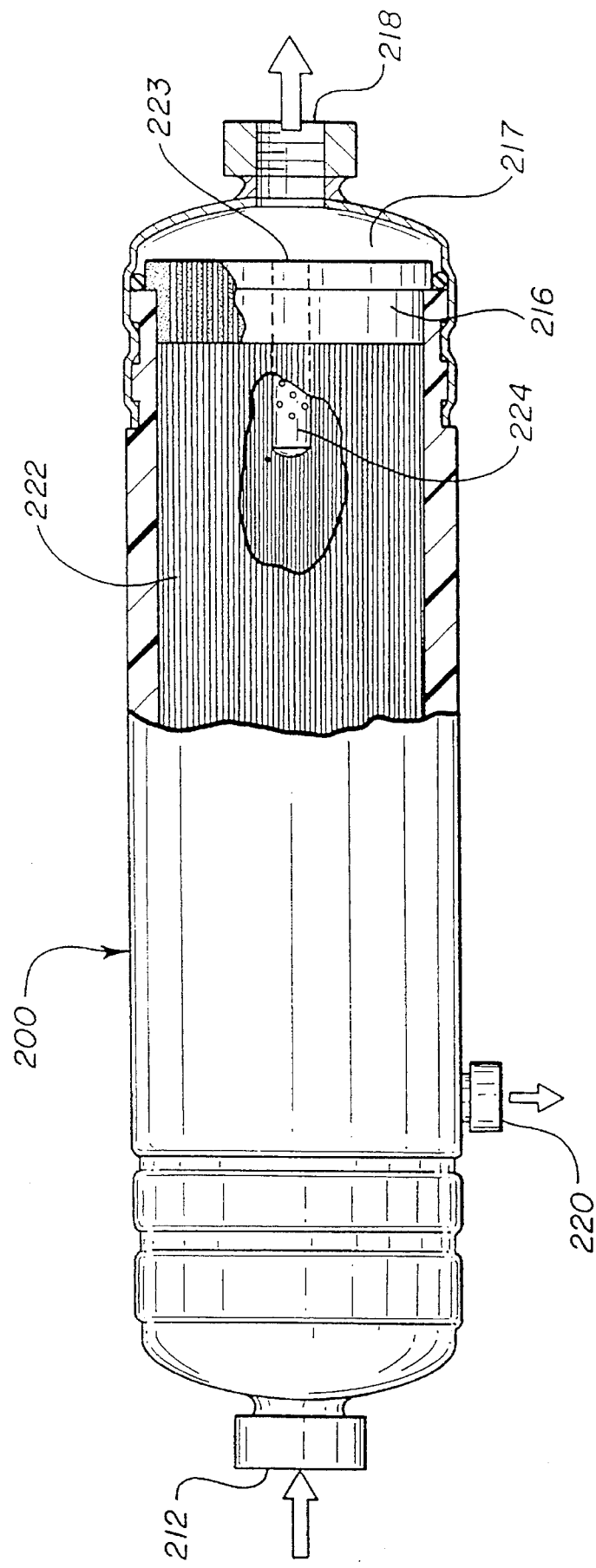
FIG. 4 is an elevational view, partially fragmented, of another embodiment of the present invention.

FIG. 4 depicts a still further embodiment of the present invention. A gas separation module 200 is provided with a port 212 to admit a pressurized feed gas containing water vapor. The gas enters the bores of the hollow fiber membranes 222 and the water vapor permeates the fibers and exits the module 200 as a permeate gas at an exit port 220. In order to enhance the dehydration of the feed gas, a countercurrent gas stream of dehydrated gas is provided through a tubesheet 216 by means of a perforated tube 224 which is open at one end 223 to receive dehydrated gas from the chamber 21 7 formed at the end of the module 200 nearest the non-permeate gas exit port 21 8. A predetermined portion of the non-permeate dehydrated gas stream passes from the chamber 21 7 through the end 228 of the perforated tube, into the tube and hence through the perforations on the cylindrical side of the tube and flows in a generally countercurrent direction to the feed gas to provide a sweep gas. The sweep gas may be provided through a multiplicity of hollow fiber membranes penetrating the second tubesheet and extending into the interior of the hollow tube. The countercurrent sweep gas proceeds on the exterior side of the hollow fibers toward the exit port 220 and exits with the permeate gas containing the majority of the water vapor originally in the feed gas. The countercurrent sweep gas provides a significantly higher driving force for water permeation, thus increasing the amount of gas that can be processed through a given gas separation module. The enhancement of the amount of gas which can be processed more than offsets the amount of dehydrated gas used as a sweep gas, thus the overall flow rate of dry non-permeate gas from the module is increased.

Estimation of the number and size of short hollow fibers or size of the hole or holes required for injection of the product gas to sweep the permeate side of the membranes, can be calculated from the theory of compressible flow through a tube or orifice under sonic conditions, and from the required flow rate of the sweep.

The sweep injection rate depends on the permselective properties of the membrane and the selected operating conditions. The sweep flow rate is adjusted to obtain a high rate of product flow per unit of membrane surface while simultaneously meeting the required recovery of product, i.e. the desired ratio of product to feed. Typically the ratio SIR=0.01 to 0.8, preferably 0.02 to 0.3, for the drying of air where S=the flow rate of the sweep, and R=the net flow rate of dry product gas exiting the gas separation module.

The number of short hollow fibers or holes required for sweep injection can be calculated for a given value of S by using the theory applicable to compressible flow through a tube or orifice under sonic conditions.

However, the preferred method for calculating the number of short hollow fibers or holes required for sweep injection, is to determine by experiment the flow rate through one short hollow fiber or hole of the desired geometry under the operating conditions, and then use this information along with the desired sweep flow rate to calculate the number of short fibers or holes needed. Desirably, the length of the short hollow fibers is less than about 25% of the length of the hollow fibers, and preferably, less than about 10%.

EXAMPLE 1

A bore feed gas separation module is assembled from a bundle of polysulfone hollow fibers. As in FIG. 4, a tube, like the tube 224, containing five hollow nylon fibers of 470 micron interior diameter and five centimeters in length, is inserted through the tubesheet at the center of the non-permeate end. The tube end which is inserted into the hollow fiber bundle is closed. The other end of the tube is open to receive non-permeate gas. The tube has several radial perforations equally spaced around the circumference of the tube to allow uniform radial flow distribution of the sweep gas. The module is provided with ports at opposite ends for the feed and non-permeate and a shell port at the feed end for the permeate gas stream to exit. The hollow fibers are dip-coated using a solution of silicone to repair membrane defects.

The gas feed stream has a dew point of 100° F. and is supplied to the module at a pressure of 100 psig and a temperature of 120° F. The module is tested with none of the nylon fibers open, then with three open and ultimately five open fibers. The results are in Table 1 below:

TABLE 1

| NO. OF OPEN FIBERS | PRODUCT FLOW scfm | PRODUCT DEW POINT °F. | PERMEATE FLOW scfm | PERMEATE/ FEED % |
| --- | --- | --- | --- | --- |
| 0 | 5.56 | 20.9 | 1.64 | 22.8 |
| 3 | 5.58 | −13.4 | 2.92 | 34.3 |
| 5 | 5.51 | −24.4 | 3.94 | 41.7 |

The results clearly show that at substantially constant product flow rate, the product dew point is decidedly reduced when the non-permeate gas sweep is used. The permeate flow is more than doubled to provide a more efficient drying of the feed gas. In practice, the maximum allowable purge ratio (permeate/feed) would be used to determine the number of short open fibers or holes to be used for the injection of sweep gas.

It had been recognized that fibers of low permeability for the carrier gas were not satisfactory for use in gas dehydration because the high selectivity for water causes the water vapor partial pressure on the permeate side to approach that on the feed side resulting in a low water permeation rate. It has been long recognized that a feasible method of providing a sweep would help correct the problem. Although some of the methods delineated in the background provided above have been used commercially, none were deemed economical or practical from an operational standpoint if the permeability of the carrier gas through the fiber is low. Example 1 demonstrates that the present invention provides lower product dew points at the same rate of product flow using defect repaired membranes of low carrier gas permeability. Another advantage of the present invention is the ability to easily locate the sweep in the center or near center to efficiently utilize the sweep flow. The invention is also suitable for dehydration of natural gas.

EXAMPLE 2

Hollow fibers, treated as in Example 1, are formed into a bundle and hence made into a gas separation module where the bundle fiber diameter is eight inches and the active length of the fiber is 10 feet; the active area is 6511 square feet. Natural gas containing 600 ppm of moisture is supplied to the shell side of the membrane separator at a pressure of 750 psia at a temperature of 104° F. A portion of the dry product gas is injected through an aperture or short hollow fiber into the permeate side in order to provide a countercurrent sweep. The results of performance simulations of this case are reported in Table 2. The product gas contains 43 ppm moisture in all cases.

TABLE 2

| SWEEP/NET PRODUCT | FEED scfm | PRODUCT scfm | PERMEATE scfm | PERMEATE/ FEED % |
| --- | --- | --- | --- | --- |
| 0.02 | 3226 | 3085 | 141 | 4.4 |
| 0.04 | 6430 | 6096 | 333 | 5.2 |
| 0.06 | 8672 | 8076 | 596 | 6.9 |

It is noted that the net product flow rate increases steadily as the sweep flow rate is increased; however, the loss of natural gas (ratio of permeate to feed) also increases. The sweep flow rate to be used is dictated by economics and the maximum acceptable loss of non-permeate (product) used as sweep.

We claim:

1. A gas dehydration process comprising:
   (a) contacting a flowing feed gas containing water vapor with fiber membranes having a hollow bore contained in a pressure module having an exterior and an interior;
   (b) permeating a majority of the water vapor contained in the feed gas through the membranes;
   (c) utilizing a portion of a resulting flowing non-permeate dehydrated gas internally of the module to provide a sweep gas flowing internally of the module to the permeate side of the fiber membranes substantially countercurrent to the flow of the feed gas; and
   (d) recovering the remaining non-permeate dehydrated gas.

2. The gas dehydration process according to claim 1 wherein the sweep gas flow rate is from about 1% to about 80% of the net flow rate of the non-permeate dehydrated gas.

3. The gas dehydration process according to claim 2 wherein the sweep gas flow rate is from about 2% to about 30% of the net flow rate of the non-permeate dehydrated gas.

4. The gas dehydration process according to claim 1 wherein the feed gas is at a pressure of at least one atmosphere.

5. The gas dehydration process according to claim 1 wherein the feed gas is comprised of ambient air.

6. The gas dehydration process according to claim 1 wherein the feed gas is comprised of hydrocarbon gases.

7. The gas dehydration process according to claim 1 wherein the feed gas is comprised of at least one of ambient air, hydrocarbon gases, and acid gases.

8. The gas dehydration process according to claim 7 wherein the feed gas contains carbon dioxide.

9. The gas dehydration process according to claim 7 wherein the feed gas is comprised of hydrocarbon gases having from one to three carbon atoms per molecule.

10. The gas dehydration process according to claim 1 wherein the feed gas is introduced to a first end of the hollow fiber bore and the dehydrated feed gas is removed from a second end of the hollow fiber bore.

11. The gas dehydration process according to claim 1 wherein the feed gas is introduced to a first exterior end of the hollow fiber membranes and the dehydrated feed gas is removed from a second exterior end of the hollow fiber membranes.

12. A membrane gas separation module having an interior and an exterior particularly suitable for gas dehydration, having a countercurrent sweep by a flowing non-permeate dehydrated gas derived from and provided internally of the module comprising within the interior of the module:
  (a) an elongated shell having a feed gas inlet to hollow fiber membranes at one end and a non-permeate product outlet at substantially the opposite end of the shell and an appropriately placed permeate outlet, the shell containing
  (b) the hollow fiber membranes being positioned in the shell extending from a first tubesheet near the feed gas inlet to a second tubesheet near the non-permeate product outlet, each end of the hollow fiber membranes terminating in and penetrating a tubesheet; and
  (c) an aperture in the second tubesheet to allow a portion of the flowing non-permeate dehydrated gas to sweep countercurrently the permeate side of the hollow fiber membranes.

13. The module of claim 12 wherein the aperture is sized to provide a sweep gas flow rate under operating conditions of from about 1% to about 80% of a net flow rate of the non-permeate dehydrated gas.

14. The module of claim 13 wherein the sweep gas flow rate is from about to about 30% of the net flow rate of the non-permeate dehydrated gas.

15. The module of claim 12 wherein the aperture is a hole in the second tubesheet.

16. The module of claim 12 having a plurality of apertures each of which is a hole in the second tubesheet.

17. The module of claim 12 wherein the aperture is a short hollow fiber membrane penetrating the second tubesheet, the length of the short hollow fiber membrane being less than about 25% of the average length of the hollow fiber membranes extending from the first tubesheet to the second tubesheet in the module.

18. The module of claim 12 having a plurality of apertures each of which is a short hollow fiber membrane penetrating the second tubesheet and averaging in length less than about 25% of the average length of the hollow fiber membranes extending from the first tubesheet to the second tubesheet in the module.

19. The module of claim 12 wherein the aperture is comprised of a cylindrical hollow tube penetrating the second tubesheet and extending no more than 10% of the distance between tubesheets, the tube being closed at the extended end and the tube having substantially equally spaced radial perforations around the tube.

20. The module of claim 19 wherein the aperture is a multiplicity of hollow fiber membranes penetrating the second tube sheet and extending into the interior of the hollow tube.

* * * * *

UNITED STATES PATENT AND TRADEMARK OFFICE
CERTIFICATE OF CORRECTION

PATENT NO. : 5,525,143
DATED : June 11, 1996
INVENTOR(S) : William H. Morgan, et al.

Page 1 of 1

It is certified that error appears in the above-identified patent and that said Letters Patent is hereby corrected as shown below:

In the Specification:

Column 2,
Line 59, delete "80%" and insert therefor --30%--.

Signed and Sealed this

Third Day of July, 2001

*Attest:*

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.     : 5,525,143
DATED          : June 11, 1996
INVENTOR(S)    : Morgan et al.

It is certified that error appears in the above-identified patent and that said Letters Patent is hereby corrected as shown below:

Column 1,
Line 25, replace "natured" with -- natural --.
Line 34, replace "partied" with -- partial --.

Column 3,
Lines 38 and 50, replace "8" with -- 3 --.
Line 64 and 67, replace "21 7" with -- 217 --.
Line 65, replace "21 8" with -- 218 --.
Line 67, replace "228" with -- 223 --.

Column 4,
Line 31, replace "SIR" with -- S/R --.

Column 7,
Line 2, replace "about to about" with -- about 2% to about --.

Signed and Sealed this

Eighteenth Day of November, 2003

JAMES E. ROGAN
*Director of the United States Patent and Trademark Office*